(12) United States Patent
Kohlndorfer

(10) Patent No.: US 8,641,096 B1
(45) Date of Patent: Feb. 4, 2014

(54) WEB MOUNTED LOAD LIMITING SEATBELT ANCHOR

(71) Applicant: Autoliv ASP, Inc., Ogden, UT (US)

(72) Inventor: Kenneth Kohlndorfer, Roseville, MI (US)

(73) Assignee: Autoliv Development AB, Vårgåda (SE)

( * ) Notice: Subject to any disclaimer, the term of this patent is extended or adjusted under 35 U.S.C. 154(b) by 29 days.

(21) Appl. No.: 13/632,543

(22) Filed: Oct. 1, 2012

(51) Int. Cl.
B60R 22/28 (2006.01)

(52) U.S. Cl.
USPC .............................. 280/805; 297/471; 297/472

(58) Field of Classification Search
USPC .............................. 280/801.1, 805, 806, 801.2; 297/470–472, 479
See application file for complete search history.

(56) References Cited

U.S. PATENT DOCUMENTS

| | | | |
|---|---|---|---|
| 3,427,694 A | | 2/1969 | Bullock |
| 3,438,674 A | * | 4/1969 | Booth et al. ................. 297/472 |
| 3,806,999 A | | 4/1974 | Fieni |
| 3,866,367 A | * | 2/1975 | Strizki .............................. 52/98 |
| 4,150,843 A | * | 4/1979 | Reid et al. ................. 280/801.1 |
| 4,239,260 A | * | 12/1980 | Hollowell ..................... 280/806 |
| 4,272,104 A | * | 6/1981 | Cuny .......................... 280/801.1 |
| 4,572,544 A | * | 2/1986 | Cunningham et al. ..... 280/801.2 |
| 4,575,118 A | | 3/1986 | Matsui et al. |
| 4,611,825 A | * | 9/1986 | Patterson .................... 280/801.2 |
| 4,866,296 A | * | 9/1989 | Thomas ........................ 307/141 |
| 4,938,914 A | * | 7/1990 | Escaravage et al. ........ 280/801.2 |
| 5,188,425 A | | 2/1993 | Foster et al. |
| 5,464,252 A | * | 11/1995 | Kanazawa et al. ............ 280/805 |
| 6,056,320 A | * | 5/2000 | Khalifa et al. ................ 280/805 |
| 6,913,288 B2 | | 7/2005 | Schulz et al. |
| 6,959,946 B2 | * | 11/2005 | Desmarais et al. ........ 280/801.2 |
| 7,137,648 B2 | | 11/2006 | Schulz et al. |
| 7,641,214 B2 | * | 1/2010 | Kahl ........................... 280/446.1 |
| 8,308,223 B2 | * | 11/2012 | King ......................... 296/190.03 |
| 2004/0145174 A1 | * | 7/2004 | Fujii et al. ................. 280/801.1 |
| 2005/0146126 A1 | * | 7/2005 | Schulz et al. ................. 280/805 |
| 2007/0138782 A1 | | 6/2007 | Murthy et al. |
| 2011/0133439 A1 | * | 6/2011 | Pearce .......................... 280/805 |

FOREIGN PATENT DOCUMENTS

DE 42 14 600 A1 11/1992

* cited by examiner

*Primary Examiner* — James English
(74) *Attorney, Agent, or Firm* — Brinks Hofer Gilson & Lione

(57) ABSTRACT

A load limiting anchor for seatbelt systems is provided. The anchor includes a pair of plates sandwiched together and connected by a rivet or other fastener. One of the plates features a key-hole shaped slot through which the rivet can move upon relative sliding motion between the plates causing material deformation as the anchor absorbs tensile exerted by the associated seatbelt system.

12 Claims, 2 Drawing Sheets

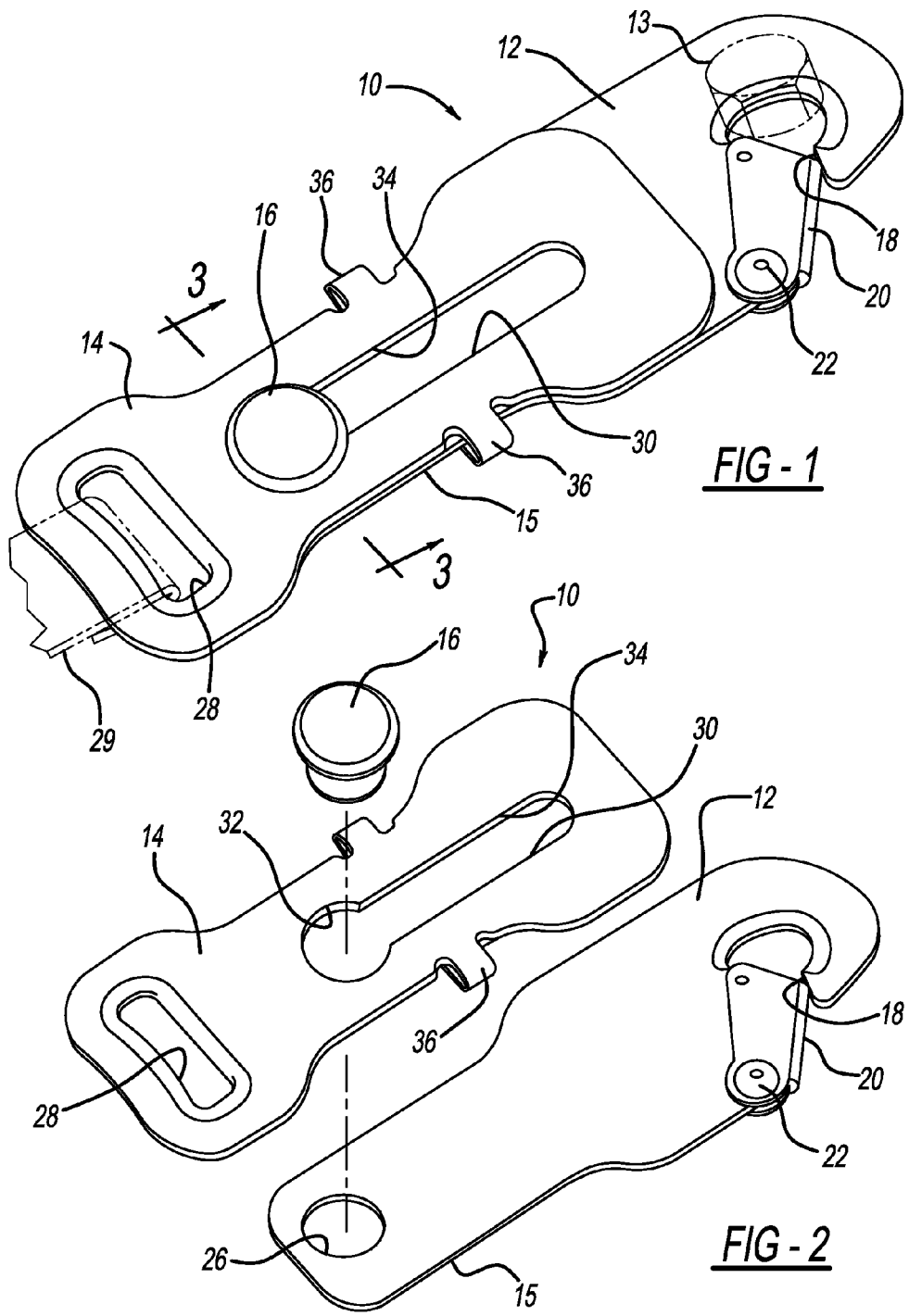

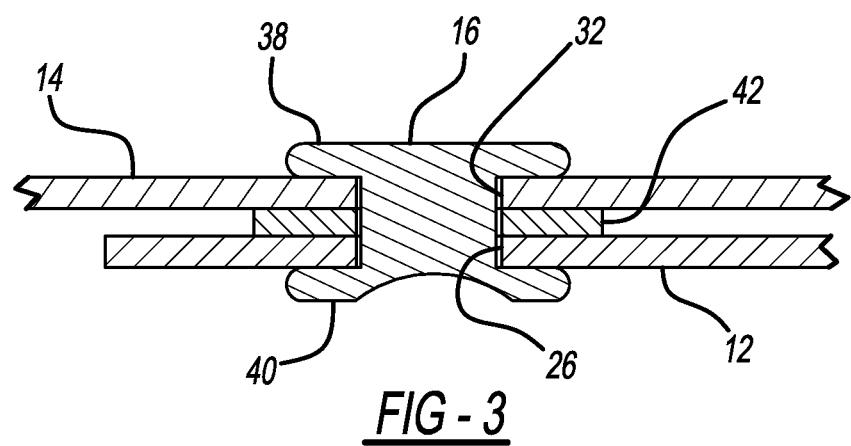

WEB MOUNTED LOAD LIMITING SEATBELT ANCHOR

FIELD OF THE INVENTION

This invention relates to a belt restraint system for vehicle applications and, in particular, to an energy absorbing anchor for such systems.

BACKGROUND OF THE INVENTION

Seatbelt systems are used in numerous motor vehicles for the purposes of restraining occupants during maneuvering and impact conditions. Seatbelt systems are found in widespread applications, including the typical three-point variety found in passenger car motor vehicles, off-road vehicles, and other vehicles. In some instances, two-point-type belt systems are used, for example, they are frequently found in aviation use for aircraft crew and passengers.

The restraint effect provided by a seatbelt system maintains an occupant in a desired position in a seat and further serves to absorb energy during an impact event and in other conditions involving high acceleration loads. When a seatbelt system is loaded by the restraining effect on an occupant, significant forces are present. These forces appear both as tension forces on the seatbelt system as well as forces acting on the seat occupant. Such forces can exceed preferred magnitudes and it is therefore known to incorporate load limiting features into seatbelt systems. Examples of load limiting belt systems are found in passenger car seatbelt retractors which incorporate torsion bars and other features for energy absorption and to limit belt loads.

Aircraft applications place significant demands on the belt restraint systems due to weight and packaging space limitations, particularly when applied for passengers. Such belt systems are typically a two-point variety without a retractor device. Instead, a cinch-type buckle or latch plate is provided for adjusting the seatbelt to the occupant. As mentioned previously, load limitation and energy absorption features are desirable for many applications of belt restraints. In aviation use, energy absorbing features can reduce injury to occupants during hard landings. Any such devices provided for aviation use must be lightweight and compact to be commercially viable.

SUMMARY OF THE INVENTION

A web mounted, load limiting anchor is provided in accordance with the present invention which can be conveniently used in seatbelt systems such as two-point aviation-type belt restraints, as well as for other applications. The anchor includes two metal plates stacked together with an energy absorbing connection therebetween. The device can be easily incorporated into existing applications due to its light weight and compactness.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWING

FIG. 1 is a pictorial view of a web mounted anchor in accordance with the present invention;

FIG. 2 is an exploded view of the anchor shown in FIG. 2; and

FIG. 3 is a cross sectional view taken along 3-3 from FIG. 1.

DETAILED DESCRIPTION OF THE INVENTION

A load limiting anchor in accordance with the present invention is generally designed by reference number 10 and is shown in its entirety by FIGS. 1 and 2. Anchor 10 principally comprises a pair of stacked plates, including anchor plate 12 and web plate 14. Rivet 16 connects these elements together as will be described in more detail as follows.

Anchor plate 12, best shown in FIG. 2, forms eyelet 18 adapted to engage a conventional belt anchor fitting such as an anchor bolt, rail, or other fasteners typically affixed to a passenger seat, floor, or other structural element of the associated vehicle. One example of such a fitting is anchor bolt 13, shown in phantom lines in FIG. 1. Conveniently, latch arm 20 is provided which pivots about fastener 22. Latch arm 20 can be formed with a U-shaped cross section from sheet metal stock and can pivot from the closed position, shown in FIGS. 1 and 2, to an open position (not shown) opening a passageway into eyelet 18 and allowing attachment of plate 12 to the previously described fitting such as bolt 13. A spring element (not shown) can be used to bias latch arm 20 to the position shown such that the arm latches the eyelet 18 onto the anchor fitting. The edges of eyelet 18 can be rounded, coated with a plastic material, or a separate bushing part can be installed there to reduce noise and rattling, and to reduce local stress at the contact between anchor plate 12 and the fitting it is attached to.

Anchor plate 12 forms a necked down segment extending to its end having rivet hole 26. The lateral edges of anchor plate 12 along portion 15 are parallel. Anchor plate 12 extends to its opposite end forming an aperture or rivet hole 26.

Plates 12 and 14 are conveniently formed from sheet metal stock, such as from aluminum or steel, and can be fabricated from stamping and blanking processes.

Web plate 14 is an elongated plate featuring web slot 28 which is provided for enabling belt webbing 29 (shown in phantom) to be wrapped through the slot and sewn for engagement with the plate. Other means for connecting to the belt system to web plate 14 can be provided. In accordance with conventional design features for such products, some means of stress relief in slot 28 can be provided, such as an inserted polymeric plastic bushing, a coating, or finishing processes which round the plate edge surfaces to prevent the plate from cutting webbing 29 under tension. A key hole shaped slot 30 is provided having a rounded rivet aperture 32 and an elongated slot extension 34 having a width less than the diameter of rivet aperture 32 as shown. Web plate 14 forms a pair of folded over laterally extending ears 36.

FIG. 1 shows plates 12 and 14 in their assembled stacked, overlapping condition. Plates 12 and 14 can be assembled by placing them together at their ends and sliding them to the overlapping position shown in FIG. 1 with ears 36 embracing the bottom surface of anchor plate 12 (as the plate is shown in FIG. 1) to trap it into engagement. Plates 12 and 14 are oriented such that rivet hole 26 and rivet aperture 32 are in registry. Thereafter, rivet 16 is placed into position through both of these apertures and its bottom end 40 is peened over or otherwise fastened in position. Once rivet 16 is installed, plates 12 and 14 are locked together. FIG. 3 shows a cross sectional view through rivet 16 showing its head 38 and end 40 which has been peened or formed to extend radially into the fastened position shown. Other fasteners could be used in place of rivet 16, such as a threaded nut and bolt type fastener.

Anchor 10 shown in FIG. 1 is mounted into the vehicle with the webbing 29 affixed as previously mentioned. Upon the occurrence of a tensile load of a predetermined magnitude, web plate 14 is pulled in a longitudinal direction relative to anchor plate 14. If this load exceeds the predetermined magnitude, the edges of slot extension 34 become deformed by movement of rivet 16 as the web plate 14 is moved relative to anchor plate 12. The full length of slot extension 34 is available to accommodate rivet 16 as it is moved along the slot extension during the process of energy absorption. The material and physical properties of plates 12 and 14, and rivet 16 can be tailored to provide predetermined load absorption characteristics.

FIG. 3 illustrates the optional incorporation of spacer in the form of washer 42 sandwiched between plates 12 and 14 and around rivet 16. Washer 42 may be formed of a polymeric material and may be desirable to provide greater control over the load absorption characteristics when plates 12 and 14 move longitudinally with respect to one another. The manufacturing process used to deform rivet 16 during assembly of anchor 10 will be tuned to produce desired clamping force or retention force between the plates. This retention force or clamping force between plates 12 and 14 can affect the threshold load at which the longitudinal relative movement between the plates occurs.

Another optional feature would be the provision of a lateral extension of anchor plate 12, for example adjacent its end with rivet hole 26 which would positively prevent the parts from becoming disassembled after longitudinal relative motion, even upon failure of rivet 16 as ears 36 could be positioned to engage the extension. For such a configuration, it would be appropriate to have ears 36 in an initial position laterally extending from plate 14, and after plates 12 and 14 are sandwiched together, the ears 36 could be deformed to the position shown. This provision would provide a positive locking feature for these parts. Rivet 16 may be made of a hardened metal material such that the rivet maintains its configuration during the energy absorption process with the material deformation occurring primarily with web plate 14.

Applications for anchors 10 may include a single anchor provided for a occupant seating position or use of an anchor mounted at each anchorage of the belt system (i.e. two or more anchors for each occupant).

The principles of the present invention are also carried out in a configuration of anchor 10 in which rivet hole 26 and slot 30 are formed on the opposite plate as shown and described above (i.e. hole 26 in plate 14 and slot 30 in plate 12). Moreover, eyelet 18 of anchor plate 12 can be replaced with a hole or aperture for mounting of the anchor to an anchor fitting such as fastener 13.

While the above description constitutes the preferred embodiment of the present invention, it will be appreciated that the invention is susceptible to modification, variation and change without departing from the proper scope and fair meaning of the accompanying claims.

The invention claimed is:

1. A load limiting seatbelt anchor adapted to be mounted to a vehicle structure by an anchor fitting and connected with seatbelt webbing comprising:

an anchor plate having means for connection with the anchor fitting for connecting the anchor plate with the vehicle structure, a web plate having a webbing slot adapted for connection to the seatbelt webbing, one of the anchor plate and the web plate forming a first aperture and the other of the anchor plate and the web plate forming a second aperture having an elongated slot extending therefrom, the one or the other of the anchor plate and the web plate further forming a pair of ears at lateral sides, and a connecting element passing through the first and second apertures, the connecting element fastening the plates together in a stacked overlapping condition and wherein upon a tensile load acting on the anchor exceeding a predetermined level, the anchor plate and web plate slide relative to one another as the plate having the elongated slot deforms as the connecting element moves relative to the slot thereby deforming material forming the slot and absorbing energy, the pair of ears limits a longitudinal movement between the anchor plate and the web plate upon failure of the connecting element.

2. The load limiting seatbelt anchor according to claim 1 further comprising the connecting element in the form of a rivet having a head and a deformable lower end.

3. The load limiting seatbelt anchor according to claim 2 further comprising the rivet formed of a hardened metal material.

4. The load limiting seatbelt anchor according to claim 1 further comprising the anchor plate forming the first aperture for receiving the connecting element and the web plate forming the second aperture and the elongated slot.

5. The load limiting seatbelt anchor according to claim 1 wherein the pair of ears laterally extend to retain the plates in a stacked orientation.

6. The load limiting seatbelt anchor according to claim 5 wherein the pair of the ears are provided at the lateral sides of the other of the anchor plate and the web plate.

7. The load limiting seatbelt anchor according to claim 1, further comprising the web plate forming the ears.

8. The load limiting seatbelt anchor according to claim 1 further comprising a spacer placed between the plates.

9. The load limiting seatbelt anchor according to claim 8 further comprising the spacer in the form of a washer placed around the connecting element.

10. The load limiting seatbelt anchor according to claim 1 further comprising the plates formed from stamped sheet metal stock.

11. The load limiting seatbelt anchor according to claim 1 further comprising means for connection in the form of the anchor plate forming a snap retainer for attachment to the mounting fitting.

12. The load limiting seatbelt anchor according to claim 1 further comprising the seatbelt anchor adapted for use in an aircraft seat belt system.

* * * * *